3,555,694
PROCESS FOR PREPARING REGENERATED CEL-
LULOSE TUBES TO BE USED AS SAUSAGE
CASINGS FOR THEIR LENGTHWISE SHIRRING
ON A SHIRRING MANDREL
Wolfgang Klendauer, Wiesbaden, Günter Gerigk, Ober-
ursel, Taunus, and Erwin Kindl, Wiesbaden-Biebrich,
Germany, assignors to Kalle Aktiengesellschaft Wies-
baden-Biebrich, Germany, a corporation of Germany
Filed Nov. 20, 1968, Ser. No. 777,393
Claims priority, application Germany, Nov. 22, 1967,
1,632,112
Int. Cl. F26b 7/00
U.S. Cl. 34—7                                          4 Claims

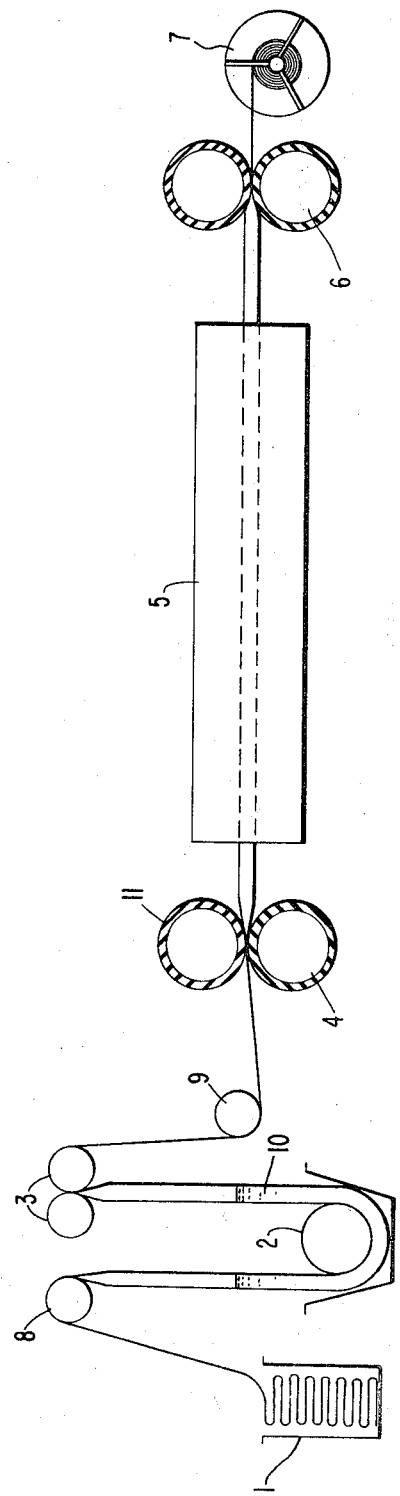

ABSTRACT OF THE DISCLOSURE

This invention relates to a process for preparing a re-
generated cellulose tube, having a water content in ex-
cess of 20 percent by weight, for shirring which com-
prises applying a lubricant to the interior of the tube and
drying the tube to a water content of 14 to 20 percent
by weight.

---

The present invention relates to a process for prepar-
ing regenerated cellulose tubes, to be used as artifical
sausage casings, for their lengthwise shirring on the shir-
ring mandrel of a shirring apparatus.

It is known to shirr artificial sausage casings of regen-
erated cellulose in their longitudinal direction. This is per-
formed by means of machines, and, with their aid, long
sections of casings from, e.g., 10 to 50 meters are com-
pressed to about 1 to 1.5 percent of their original length,
if desired after a second compression of the already
shirred casings. In the machines used for shirring, the
casing is drawn over a mandrel and then compressed
against a stop by means of transport elements which con-
vey it in its longitudinal direction. Shirring is performed
in particular for the purpose of being able to fill a length
of artificial sausage casing with sausage meat sufficient
for a great number of sausages in a single operation.

Although, for technical reasons, regenerated cellulose
casings must have a relatively high water content of about
14 to 20 percent by weight while they are being filled with
the sausage meat at the machine, it hitherto has been nec-
essary to prepare the sausage casings for the shirring proc-
ess by reducing their water content to about 7 to 9 per-
cent. Such an extensive drying process has been neces-
sary in the past because, otherwise, the shirring process
does not operate satisfactorily since the sausage casing
is frequently damaged.

The present invention relates to the preparation of a
regenerated cellulose casing for the shirring process in
such a manner that its moisture content need not be in-
creased before it is filled with the sausage meat, thus
eliminating an additional processing step.

The process of the invention is based upon the known
process wherein the water content of a regenerated cel-
lulose tube containing more than 20 percent by weight of
water is reduced by drying to a water content suitable
for shirring the tube on a shirring mandrel in its longi-
tudinal direction. The interior of the regenerated cellu-
lose tube containing more than 20 percent by weight of
water is wetted with a lubricant and the tube is then
dried to a water content of 14 to 20 percent by weight.
When shirring tubes with a water content of 14 to 20
percent, the interior of which has been wetted with a lubri-
cant, no damage to the tube occurs, or damage to the tube
is as rare as in the case where tubes are shirred having
a water content of 7 to 9 percent by weight.

The layer of lubricant applied to the interior of the tube
in accordance with the invention can be very thin. Wet-
ting may be performed simultaneously with the drying
of the tube, which is necessary in any event. For this pur-
pose, a certain quantity of lubricant is introduced into
the wet tube as it leaves the tube manufacturing machine,
and is retained by means of a pair of squeeze rolls which
the tube passes while it travels on, so that the inner sur-
face of the tube is wetted with the lubricant. The tube
is then dried with hot air, while it is inflated, advan-
tageously, in a continuous operation, between two pairs
of squeeze rolls in known manner. However, the tube is
dried only until it has a water content of 14 to 20 per-
cent by weight.

Due to the fact that the tube wetted with the lubricant
passes the above-mentioned pair of squeeze rolls and is
inflated during the subsequent drying process, the wetting
agent is relatively evenly distributed over the entire inte-
rior surface of the tube in the form of a thin film.

Suitable lubricants are, in particular paraffin oil and
similar liquids with a gliding action corresponding to
that of paraffin oil. Despite the fact that they are applied
to the interior of the sausage casing in the form of a
thin film only, the lubricants used must comply with the
requirements of foodstuff legislation, because traces there-
of are transferred to the sausage meat. Paraffin oil has
proved to be best suited as lubricant, and in its purest
form (DAB 6), it complies with the requirements of the
foodstuff laws. Oily or solid natural and synthetic fatty
acid glycerides also are suitable.

The thickness of the layer of lubricant applied to the
inner surface of the tube in the manner described above
depends substantially upon the kind of materials used,
in particular the elasticity of the squeeze rolls, the squeeze
pressure applied, and the speed of the tube at it passes
the squeeze rolls.

Further, it has been found that the lubricant applied
to the interior surface of the tube is of a more uniform
thickness when the lubricant is applied in admixture with
a readily volatile diluting medium. By selecting an ap-
propriate mixing proportion of lubricant and diluting me-
dium, it is possible to apply layers of practically unlim-
ited thinness to the interior of the tube. During the dry-
ing process, using hot air, the low boiling point diluting
medium is evaporated from the mixture, so that the lubri-
cant alone wets the inner surface of the tube in the form
of an extremely thin film. All that is required of the film
of lubricant is that it be sufficient to prevent the tube
from sticking to the mandrel during the shirring process.
When using a readily volatile solvent, it also is possible
to employ solid lubricants, such as the solid fatty acid
glycerides mentioned above.

The invention will be further illustrated by reference
to the accompanying drawing which shows, in a diagram-
matic representation, one embodiment of an apparatus for
performing the invention.

In this particular embodiment, a long length of a re-
generated cellulose tube manufactured on a tube extruder,
which is still wet and has a water content of more than
20 percent, is first placed into a delivery container 1 in
the form of loops winding to and fro. When operation of
the apparatus shown in the figure is started, the tube lying
in the delivery container 1 is removed therefrom in such
a manner that the upper-most end of the tube, which in
the following will be designated as the "leading end" of
the first length of tube, is introduced manually into the
apparatus. The tube is first led around a first guide roll 8
which it passes in the flat state and by which it is de-
flected vertically downwards. Then the tube passes around
a second guide roll 2, by which it is deflected vertically
upwards, and passes between a first pair of squeeze rolls
3. This pair of squeeze rolls serves for squeezing of ex-
cess lubricant. From this pair of rolls, and after being deflected by a third guide roll 9, the tube reaches first a second and then a third pair of squeeze rolls 4 and 6 which are mounted at the same elevation. Between the two pairs of squeeze rolls 4 and 6, the tube passes through a drying chamber 5 in the horizontal direction. The rolls of the pairs of squeeze rolls 4 and 6 are covered with a lining of an elastic material, e.g. rubber.

The lubricant 10 required for preparing the tube in accordance with the invention, if desired in diluted form, is contained in that part of the tube which passes beneath the second guide roll 2 and is conducted around it, and also in adjacent parts of the tube to both sides, where the tube is guided vertically upwards and vertically downwards, respectively. The lubricant is advantageously introduced into the open leading end of the first length of tube after it has been led around the second guide roll 2, but before it has passed the first pair of squeeze rolls. The quantity of lubricant or diluted lubricant filled into the first length of tube should be sufficient for wetting the desired number of tube lengths. Between the first guide roll 8 and the first pair of squeeze rolls 3, the portion of tube not filled with the lubricant 10 is more or less filled with air which leaks into the tube when the first length of tube is introduced into the machine and the lubricant is filled in. During operation of the machine, this quantity of air remains included in the respective portion of the tube which passes this station of the machine. If desired, the quantity of air included may be controlled, in known manner.

As soon as the leading end of the first length of tube has passed the third pair of squeeze rolls 6, the pair is opened, if it is not already open, and air is introduced into the tube approximately in such a quantity that, after the third pair of squeeze rolls has been closed and operation has started, the tube is maintained inflated to such a degree during the drying process as is desirable for achieving the final calibration of the tube. Exact proportioning of the quantity of air enclosed is effected in known manner during operation of the machine by introducing an additional quantity of air, when the quantity already enclosed proves to be too small, or by removal of air, when too large a quantity is enclosed.

Finally, the dried tube is wound on a reel and is fed into the shirring machine in this form.

The last pair of squeeze rolls 6 and the reel 7 are driven, in a manner not shown, in order to pull the tube through the machine and to wind it up. Advantageously, the second pair of squeeze rolls 4 also is driven.

To enable several lengths of tube to pass through the machine without interrupting its operation, the trailing end of the tube passing through the machine is connected, before it has passed the first guide roll 8, with the leading end of the length of the tube next following in the passage through the machine. The connection may be made by means of a rubber hose which is tied with a wet regenerated cellulose strip after the tube ends to be connected have been slipped thereon.

The process of the invention has the advantage that regenerated cellulose tubes with a moisture content of more than 20 percent may be prepared, by drying, for the shirring process in shirring apparatuses in such a manner that they need be dried only to such a degree that their water content is still sufficient for them to be filled at sausage machines, after shirring, without a subsequent increase of their water content, and that, due to the preparation according to the invention, no difficulties or damage are caused during shirring or during the filling of the shirred tubes with sausage meat. By preparing the sausage casings in accordance with the present invention, working time and energy are saved, because the drying process can be less intensive than before and, more particularly, because no additional moisture must be applied to the shirred sausage casings in a separate working step.

The invention will be further illustrated by reference to the following specific examples:

EXAMPLE 1

A length of about 500 m. cut from a regenerated cellulose tube, manufactured by the usual extruding process and containing about 60 percent of water after leaving the plasticizer bath of the spinning machine, is placed into a container in the form of loops. This tube is then wetter in the manner described above on its inner surface with a layer of high-grade paraffin oil (DAB 6: viscosity 32 cp. at a temperature of 20° C.), by pouring 1000 ml. of paraffin oil into the leading end of the tube, and then dried.

The speed of the tube when passing through the drying channel is 22 m. per minute. In the drying channel, hot air at a temperature of about 100° C. is blown countercurrently to the direction of the tube. After leaving the drying channel, the tube has a water content of about 14 to 16 percent, based on the weight of the tube.

During this treatment, the thickness of the tube wall, which originally was 0.198 mm. is reduced to 0.038 mm. The original circumference of the tube of 88 mm. is increased to 128 mm. by the air pressure applied during the drying process. The inner side of the tube is covered with a uniform thin layer of paraffin oil which amounts to 5 to 6 percent of the weight of the tube.

The quantity of paraffin oil introduced into the tube is sufficient to cover the inside of a length of tube of at least 1500 meters with a paraffin oil layer, before the quantity of paraffin oil present in the tube becomes too small to guarantee uniform coating.

The tubes dried, in the manner described above, to a water content of about 14 to 16 percent may be shirred on a shirring apparatus without being damaged.

EXAMPLE 2

For treating lengths of tube having a circumference of 42 mm., a wall thickness of 0.13 mm., and a water content of 60 to 70 percent, 300 ml. of a solution consisting of 60 parts by weight of paraffin oil (as in Example 1), and 40 parts by weight of methylene chloride are poured into the leading end of the first length of tube.

After drying, the tube has a moisture content of 14 to 16 percent, a wall thickness of 0.028 mm., and a circumference of 58 mm. Its inner surface is evenly covered with a paraffin oil layer constituting 0.8 to 1.0 percent of the weight of the tube. The methylene chloride used for diluting the paraffin oil is completely evaporated.

At a speed of 22 meters per minute, 100 ml. of a mixture of 40 parts by weight of paraffin and 60 parts by weight of methylene chloride are poured every hour into the tube in order to replace the spent paraffin oil and methylene chloride. In this manner, the composition of the paraffin oil solution enclosed in the tube remains substantially unchanged. After 8 hours operation, the paraffin oil solution contained in the tube is drained off and replaced by 300 ml. of the paraffin oil solution first mentioned above.

Lengths of tube prepared in this manner for the shirring process can be satisfactorily shirred on a shirring apparatus of the type described in U.S. Pat. 3,231,932, and then may be filled with sausage meat by means of a sausage machine, without having to adjust the water content of the artificial sausage casing.

It will be obvious to those skilled in the art that many modifications may be made within the scope of the present invention without departing from the spirit thereof, and the invention includes all such modifications.

What is claimed is:

1. A process for preparing a regenerated cellulose tube, having a water content in excess of 20 percent by weight, for shirring which comprises applying a lubricant to the interior of the tube and drying the tube to a water content of 14 to 20 percent by weight.

2. A process according to claim 1 in which the lubricant is in solution in a volatile solvent.

3. A process according to claim 2 in which the tube is inflated during drying.

4. An apparatus for preparing a regenerated cellulose tube, having a water content in excess of 20 percent by weight, for shirring which comprises nip roll means for forcing a lubricant over the interior surface of the tube passing through the nip, drying means for drying the lubricated tube, and nip roll means mounted adjacent each end of the drying means for retaining a gas in the portion of tube being dried.

References Cited

UNITED STATES PATENTS

| | | | |
|---|---|---|---|
| 2,030,625 | 2/1936 | Ellis | 34—12X |
| 2,186,135 | 1/1940 | Childs | 34—12X |
| 3,041,736 | 7/1962 | Peterson et al. | 34—12 |

JOHN J. CAMBY, Primary Examiner